US012558673B2

(12) United States Patent
Caravaggio et al.

(10) Patent No.: US 12,558,673 B2
(45) Date of Patent: Feb. 24, 2026

(54) METHANE OXIDATION CATALYST AND METHOD OF USING SAME

(71) Applicant: His Majesty the King in Right of Canada as Represented by the Minister of Natural Resources, Ottawa (CA)

(72) Inventors: Gianni Caravaggio, Ottawa (CA); Lioudmila Nossova, Ottawa (CA)

(73) Assignee: His Majesty the King in Right of Canada as Represented by the Minister of Natural Resources, Ottawa (CA)

( * ) Notice: Subject to any disclaimer, the term of this patent is extended or adjusted under 35 U.S.C. 154(b) by 0 days.

(21) Appl. No.: 17/665,998

(22) Filed: Feb. 7, 2022

(65) Prior Publication Data

US 2022/0152590 A1 May 19, 2022

Related U.S. Application Data

(62) Division of application No. 15/775,159, filed as application No. PCT/CA2016/051209 on Oct. 19, 2016, now abandoned.

(60) Provisional application No. 62/254,241, filed on Nov. 12, 2015.

(51) Int. Cl.

| | |
|---|---|
| *B01J 23/44* | (2006.01) |
| *B01D 53/72* | (2006.01) |
| *B01D 53/94* | (2006.01) |
| *B01J 21/04* | (2006.01) |
| *B01J 23/10* | (2006.01) |
| *B01J 23/63* | (2006.01) |
| *B01J 35/61* | (2024.01) |
| *B01J 37/02* | (2006.01) |

(52) U.S. Cl.
CPC .............. *B01J 23/44* (2013.01); *B01D 53/72* (2013.01); *B01D 53/94* (2013.01); *B01D 53/944* (2013.01); *B01J 21/04* (2013.01); *B01J 23/10* (2013.01); *B01J 23/63* (2013.01); *B01J 35/615* (2024.01); *B01J 35/617* (2024.01); *B01J 35/618* (2024.01); *B01J 37/0201* (2013.01); *B01J 37/0244* (2013.01); *B01D 2255/1021* (2013.01); *B01D 2255/1023* (2013.01); *B01D 2255/2063* (2013.01); *B01D 2255/2092* (2013.01); *B01D 2255/9207* (2013.01); *B01D 2257/7025* (2013.01); *B01D 2258/018* (2013.01); *Y02C 20/20* (2013.01)

(58) Field of Classification Search
CPC ...... B01D 53/72; B01D 53/94; B01D 53/944; B01J 23/44; B01J 23/10; B01J 23/63; B01J 21/04; B01J 35/1019; B01J 35/1023; B01J 35/1028; B01J 37/0201
USPC ....................................................... 423/245.3
See application file for complete search history.

(56) References Cited

U.S. PATENT DOCUMENTS

| | | | |
|---|---|---|---|
| 4,008,037 A | 2/1977 | Hindin et al. | |
| 5,131,224 A | 7/1992 | Siewert et al. | |
| 9,034,286 B2 | 5/2015 | Bergeal et al. | |
| 9,731,286 B2 | 8/2017 | Polli et al. | |
| 2016/0346731 A1* | 12/2016 | Umeno ................ B01J 37/0244 |

FOREIGN PATENT DOCUMENTS

| | | | | |
|---|---|---|---|---|
| CN | 103131488 A | 6/2013 | | |
| CN | 104368327 A | 2/2015 | | |
| EP | 0130835 A2 | 1/1985 | | |
| JP | H08332392 A | * 12/1996 | | |
| JP | 6380847 B2 | 8/2018 | | |
| WO | WO-9713963 A1 | * 4/1997 | ............. | B01D 53/32 |
| WO | WO-2007087725 A1 | * 8/2007 | ........... | B01D 53/944 |
| WO | WO-2010114379 A1 | * 10/2010 | ........... | B01D 53/944 |
| WO | 2015/099348 A1 | 7/2015 | | |
| WO | WO-2015111555 A1 | * 7/2015 | ........... | B01D 53/945 |

OTHER PUBLICATIONS

Smith et al., "La-Dopant Location in La-Doped γ-Al2O3 Nanoparticles Synthesized Using a Novel One-Pot Process", The Journal of Physical Chemistry, Oct. 2015, 119, 25053-25062. (Year: 2015).*
JPH 08332392 A English translation (Year: 1996).*
Smith et al. "La-Dopant Location in La-Doped ?-Al2O3 Nanoparticles Synthesized Using a Novel One-Pot Process" The Journal of Physical Chemistry, Oct. 2015, 119, 25053-25062.
Feb. 23, 2021—(US) Non-Final Office Action—U.S. Appl. No. 15/775,159.

* cited by examiner

*Primary Examiner* — Anita Nassiri-Motlagh
(74) *Attorney, Agent, or Firm* — Banner & Witcoff, Ltd.

(57) ABSTRACT

Provided herein is a methane oxidation catalyst having a support comprising alumina doped with lanthanum and comprising platinum and palladium as active phases. The platinum and palladium are present in the catalyst at an amount effective for producing an exhaust stream from a natural gas vehicle having reduced levels of methane. The catalyst disclosed herein may exhibit improvements in sulfur and water resistance.

15 Claims, No Drawings

METHANE OXIDATION CATALYST AND METHOD OF USING SAME

RELATED APPLICATION DATA

This application is a divisional of U.S. patent application Ser. No. 15/775,159, filed May 10, 2018, which is a National Stage Application under 35 U.S.C. 371 of PCT application number PCT/CA2016/051209 designating the United States and filed Oct. 19, 2016; which claims the benefit of U.S. Provisional application No. 62/254,241 and filed Nov. 12, 2015 each of which are hereby incorporated by reference in their entireties.

TECHNICAL FIELD

Provided herein is a methane oxidation catalyst for reducing unburned methane in a gas stream resulting from methane combustion in a natural gas vehicle and a method for using same.

BACKGROUND

Natural gas has received increased interest as a fuel for the transportation sector since it is abundant and inexpensive. Lean burn natural gas engines are similar in performance to diesel engines and can be used in a wide variety of transportation applications such as light and medium duty vehicles, vocational and long haul trucks and ships. Natural gas engines offer a cleaner alternative than diesel and gasoline engines in that they produce approximately 20 to 25% less greenhouse gases (GHG) on a life-cycle basis due to the lower carbon content of methane. However, natural gas engines suffer from high levels of unburned methane in the exhaust. Because methane is a potent GHG (21 times GHG impact compared to $CO_2$), unburned methane in natural gas vehicle exhaust can negate its GHG benefit. While under certain conditions it is possible to calibrate the engine combustion to meet a methane emissions target, this can come at the expense of adversely impacting engine efficiency and other regulated emissions (e.g. $NO_x$).

The use of catalysts to eliminate unburned methane is a possible solution, although this approach has been tried in the past and a commercial satisfactory solution is not yet available. A disadvantage of current catalysts is that they can be deactivated in the presence of sulfur and/or water, both of which are components of natural gas engine exhaust. Furthermore, catalysts are often not resistant to thermal and/or hydrothermal aging.

SUMMARY

The present disclosure relates to a methane oxidation catalyst, use of the catalyst and methods of using same.

According to one exemplary embodiment, there is provided a method for reducing unburned methane in a gas stream resulting from methane combustion in a natural gas vehicle (NGV), the gas stream comprising sulfur, the method comprising passing the gas stream through a methane oxidation catalyst having a support comprising alumina doped with lanthanum and comprising platinum and palladium as active phases, thereby producing an exhaust stream from the natural gas vehicle having reduced levels of methane relative to the gas stream resulting from methane combustion, wherein the platinum and palladium are present in the methane oxidation catalyst at a weight ratio of Pt:Pd that is greater than 0.75:1.0.

According to a further exemplary embodiment, there is provided use of a methane oxidation catalyst for reducing unburned methane in a gas stream resulting from methane combustion in a natural gas vehicle (NGV), the gas stream comprising at least sulfur, the methane oxidation catalyst having a support comprising alumina doped with lanthanum and comprising platinum and palladium as active phases, wherein the platinum and palladium are present in the methane oxidation catalyst at a weight ratio of Pt:Pd that is greater than 0.75:1.0.

According to any one of the foregoing embodiments, the gas stream resulting from the methane combustion may have a temperature of between 350° C. and 600° C.

According to any one of the foregoing embodiments, the gas stream resulting from methane combustion comprises between 10 and 20,000 ppm of methane. In another embodiment, the gas stream resulting from methane combustion comprises oxygen. Yet further, the gas stream of any one of the foregoing embodiments resulting from methane combustion comprises water.

According to another exemplary embodiment, there is provided a methane oxidation catalyst for use in a catalytic converter that is mountable on a natural gas vehicle (NGV), the methane oxidation catalyst having a support comprising alumina doped with lanthanum and comprising platinum and palladium as active phases, and are present at an amount effective for producing an exhaust stream from the vehicle having reduced levels of methane in the presence of sulfur relative to a gas stream resulting from combustion, wherein the platinum and palladium are present in the methane oxidation catalyst at a weight ratio of Pt:Pd that is greater than 0.75:1.0.

According to any one of the foregoing embodiments, the catalyst may contain platinum at an amount between 0.5 and 10 wt % and/or the palladium at an amount between 0.5 and 10 wt %. In another embodiment, the platinum is present in the amounts between 3 and 5 wt % and the palladium is present at an amount between 1 and 3 wt %. Yet further, the palladium may be present in the catalyst at greater than 2 wt %.

According to any one of the foregoing embodiments, the catalyst may have a $T_{50}$ of below 460° C. after aging in a simulated natural gas vehicle (NGV) exhaust for 500 h at 500° C. in the presence of 10 vol % water and 10 ppm sulfur dioxide.

According to any one of the foregoing embodiments, the methane oxidation catalyst is prepared by incipient wetness impregnation in which the platinum and palladium are added sequentially, or the methane oxidation catalyst is prepared by wet impregnation in which the platinum and palladium are added simultaneously.

According to any one of the foregoing embodiments, the alumina is gamma alumina. In yet a further embodiment, the specific surface area (BET) of the lanthanum doped support is at least 120 $m^2/g$.

DETAILED DESCRIPTION

Embodiments disclosed herein are directed to a methane oxidation catalyst having a support comprising alumina doped with lanthanum and comprising platinum and palladium as active phases. Such catalyst may be used to reduce the amount of methane in a gas stream resulting from methane combustion in the engine of a natural gas vehicle (NGV). Unburned methane remaining after combustion is converted to carbon dioxide and water. As a result, the exhaust stream from the vehicle will have reduced levels of methane, which is a potent greenhouse gas. Certain exemplary embodiments may provide a methane oxidation catalyst for use in a natural gas vehicle with enhanced resistance to deactivation in the presence of gaseous water and sulfur and/or that display enhanced thermal stability.

By the term "vehicle" as used herein, it is meant any machine or device used as a transportation means over land, sea or space. The vehicle may be a compressed natural gas (CNG) or liquid natural gas (LNG) vehicle. The vehicle may be powered by a lean burn engine. In such an engine, excess air is introduced to the combustion chamber.

By the term "doped" with reference to the presence of lanthanum in the alumina support, it is meant that the methane oxidation catalyst contains lanthanum (La) in alumina matrix. Without being limiting, lanthanum may also be present at least on the surface of the alumina, or a combination thereof.

In one embodiment, the support doped with lanthanum is a metal oxide such as alumina. Alumina, also known as aluminium oxide, is a chemical compound of aluminium and oxygen with the chemical formula $Al_2O_3$. An example of an alumina support doped with lanthanum that may be used to prepare the catalyst is Puralox® Scfa 140L3. The catalyst may also comprise a mixture of different support materials. The alumina may be gamma alumina. In another embodiment, the specific surface area (BET) of the support is at least 120 $m^2/g$, at least 130 $m^2/g$ or at least 140 $m^2/g$.

The platinum and palladium are each present in the catalyst at an amount effective for producing an exhaust stream from the natural gas vehicle having reduced levels of methane in the presence of sulfur relative to a gas stream resulting from combustion. The concentration of the metals may be effective to reduce the methane content in the gas stream resulting from methane combustion by at least 65%, or by at least 75%, at 500° C. after 500 hours on stream. Examples of ranges of effective amounts of each active metal are set forth below. The precise amounts of platinum and palladium for obtaining enhanced methane conversion can be determined by the methodology set forth in the examples.

In one embodiment, the platinum is present at a higher concentration in the catalyst than palladium. For example, the platinum and palladium may be present in the catalyst at a weight ratio of greater than 1 by weight. In one embodiment, the weight ratio of Pt:Pd is at least 0.75:1.0, 1.0:1.0, 1.25:1.0, 1.5:1.0, 1.75:1.0 or 2.0:1.0. Certain embodiments also include a range of Pt:Pd weight ratios. The upper limit of the range may be Pt:Pd of 5.0:1.0 (wt:wt) and can be combined with any of the above-mentioned lower limits. In other embodiments, the range of weight ratios of Pt:Pd can be 0.75:1 to 4.0:1, 0.85:1 to 4.0:1 or 0.9:1 to 3.0:1.0.

In one embodiment, the platinum is present in the catalyst at a concentration of between 0.5 wt % and 10 wt %, or between 1 wt % and 8 wt %, or between 1.5 wt % and 6 wt %, or between 2.0 wt % and 5.5 wt %, or between 2.5 wt % and 5 wt % or between 3.0 wt % and 4.5 wt %.

In a further embodiment, the palladium is present in the catalyst at a concentration of between 0.5 wt % and 10 wt %, or between 0.5 wt % and 6 wt %, or between 0.5 wt % and 4 wt %, or between 0.5 and 3 wt %, or between 0.75 wt % and 3.5 wt % or between 1 wt % and 3 wt %.

In a further embodiment, palladium is present in the methane oxidation catalyst at a concentration of between 2 wt % and 10 wt %, or between 2 wt % and 6 wt %, or between 2 wt % and 4 wt %.

In one embodiment, the methane oxidation catalyst has a $T_{50}$ of below 460° C. after aging in a simulated natural gas vehicle exhaust. As would be known to those of skill in the art, $T_{50}$ is the temperature at which half the methane in a gas stream is combusted to carbon dioxide and water. The $T_{50}$ is measured as described in Example 1. Methane conversion was determined using a bench scale reactor. The temperature at 50% methane conversion was determined after aging at 500° C. for 500 h in the presence of 1,000 ppm $CH_4$, 10% $O_2$, 6% $CO_2$, 10% $H_2O$ vapour and 10 ppm $SO_2$. The reactant gas hourly space velocity (GHSV) was ~55,000 $h^{-1}$.

The catalyst may be prepared by any method known to those of skill in the art. A non-limiting example of a suitable method is incipient wetness impregnation (IWI). According to this method, the active metal precursor is dissolved in an aqueous or organic solution. Then the metal-containing solution is added to a catalyst support and capillary action draws the solution into the pores. The catalyst can subsequently be dried and calcined to drive off the volatile components within the solution, depositing the metal on the catalyst surface. The concentration profile of the impregnated compound depends on the mass transfer conditions within the pores during impregnation and drying.

Catalysts may also be prepared by the wet impregnation (WI) method. According to this method, the support powder is suspended in an excess of a solution containing one or more precursors and stirred for some time in order to fill the pores with the precursor solution. The pH of the impregnating solution can be adjusted to a basic pH, for example using a concentrated solution of ammonia, to provide electrostatic interaction between cationic metal species and negatively charged surface hydroxyls of the support. The catalyst is subsequently dried followed by calcination in air.

As noted, the catalyst can be prepared by any suitable method. However, the method of preparing the catalyst can impact the properties of the catalyst and can lead to improvements in the $T_{50}$ value. Thus, the method for preparation can be selected to achieve a desired $T_{50}$ value. In one non-limiting example, the catalyst is prepared by IWI and the metals are added sequentially. In such embodiment, the catalyst is dried and calcined between additions of metal. In yet a further embodiment, the catalyst is prepared by the IWI method and the platinum is added before palladium. In another embodiment, the catalyst is prepared by WI and the metals are added simultaneously. Simultaneous addition includes dissolving the metals together and subsequently adding them to the support, followed by drying and calcination. Employing either of these methods can result in a catalyst exhibiting a $T_{50}$ value that is below about 460° C. (see Table 6 below).

The methane oxidation catalyst may be used in the manufacture of a catalytic converter that is mounted on the exhaust system of a natural gas vehicle. The catalytic converter may be produced by known methods. Without being limiting, the catalytic converter may be a two-way catalytic converter.

When the methane oxidation catalyst is in use, a gas stream resulting from natural gas combustion in a combustion chamber in a vehicle passes through the methane oxidation catalyst of the catalytic converter, thereby reducing its methane content. As a result, reduced concentrations of methane are emitted to the atmosphere from the exhaust, such as the tail pipe of a natural gas powered car or truck. The gas stream resulting from methane combustion in the natural gas engine will typically comprise at least sulfur and water. Other components that may be present in the gas stream may include oxygen and carbon dioxide.

The methane content in the gas stream resulting from methane combustion may contain between 10 and 20,000 ppm or methane, between 100 and 10,000 ppm of methane, or between 200 and 5,000 ppm of methane.

The sulfur content in the gas stream resulting from methane combustion may be between 1 ppm and 30 ppm sulfur, or between 3 ppm and 30 ppm sulfur or between 5 ppm and 30 ppm sulfur or between 6 ppm and 30 ppm sulfur.

The gas stream resulting from methane combustion may have a temperature of between 350° C. and 600° C. or between 400° C. and 600° C.

EXAMPLES

Table 1 below summarizes the composition of the methane oxidation catalysts used in the experiments and the notation used to refer to each catalyst composition throughout the example section. The notations employed herein include a designation assigned to each catalyst preparation representing the metals present in the catalyst ("PdPt" or "Pd"), followed by the nominal loading of the metal or metals represented by a fraction (wt:wt) of the two metals. As indicated in Table 1, the balance of the catalyst in each case contains a lanthanum doped alumina support that is commercially available under the trade-name, Puralox® Scfa140L3.

TABLE 1

| Composition of catalysts and their notation used herein | | | | | |
|---|---|---|---|---|---|
| | Catalyst designation/nominal loading (wt %) | | | | |
| Component | PdPt(1:2) | PdPt(2:2) | PdPt(2:4) | PdPt(4:2) | Pd(0.5) |
| Pd (wt %) | 1 | 2 | 2 | 4 | 0.5 |
| Pt (wt %) | 2 | 2 | 4 | 2 | 0 |
| Puralox ® Scfa140L3 | Balance | Balance | Balance | Balance | Balance |

Example 1: Catalysts with Pd and Pt on a Lanthanum Doped Alumina Exhibit Enhanced Methane Conversion after Aging in the Presence of Sulfur and Water Two catalysts comprising platinum (Pt) and palladium (Pd) were prepared by incipient wetness impregnation (IWI) The first was prepared using 4 wt % Pt and 2 wt % Pd and the second with 2 wt % Pt and 4 wt % Pd on a lanthanum doped alumina support (Puralox® Scfa 140L3). For both catalysts, the palladium was added last in the impregnation sequence. Methane conversion was determined using a bench scale reactor. The temperatures at 50% methane conversion ($T_{50}$) were determined for fresh and aged catalysts by running the sample in a temperature range from 150 to 600° C. (3°/min) in the presence of 1,000 ppm $CH_4$, 10% $O_2$, 6% $CO_2$, 10% $H_2O$ vapour and 10 ppm $SO_2$ and at a reactant gas hourly space velocity (GHSV) of ~55,000 $h^{-1}$. Aging was performed at 500° C. in the presence of 1,000 ppm $CH_4$, 10% $O_2$, 6% $CO_2$, 10% $H_2O$ vapour and 10 ppm $SO_2$ with a reactant gas hourly space velocity (GHSV) of ~55,000 $h^{-1}$. The time periods for aging were 40, 100, 200, 300 and 500 hours.

The results are shown in Table 2 below.

TABLE 2

| $T_{50}$ values of PdPt(2:4) and PdPt(4:2) catalysts after aging at 500° C. | | | | | | |
|---|---|---|---|---|---|---|
| | Aging time (h)/$T_{50}$ (° C.) | | | | | |
| Catalyst | 0 | 40 | 100 | 200 | 300 | 500 |
| PdPt(2:4) | 362 | 449 | 456 | 460 | 450 | 454 |
| PdPt(4:2) | 356 | 452 | 458 | 461 | 463 | 466 |

The presence of both metals in a catalyst comprising a lanthanum doped alumina support enhanced the methane oxidation performance of the catalyst. The results in Table 2 show a $T_{50}$ of near 450° C. for PdPt(2:4) after aging at 300 and 500 hours at 500° C. in the presence of both sulfur and water vapour ($T_{50}$ of 450 and 454 at 300 and 500 hours, respectively). The PdPt(4:2) catalyst exhibits a $T_{50}$ of near 460° C. after the same aging duration ($T_{50}$ values of 463° C. and 466° C. at 300 and 500 hours, respectively). These results thus show that both catalysts displayed excellent chemical and hydrothermal stability in the presence of sulfur and water. Nevertheless the PdPt(2:4) catalyst displayed better performance ($T_{50}$ of 454° C.) than the PdPt(4:2) catalyst ($T_{50}$ of 466° C.) after the longest aging time (500 hours). This indicates that a higher Pt to Pd ratio achieves increased long-term hydrothermal stability and sulfur resistance.

Example 2: A Catalyst with a Lanthanum Doped Alumina Support Exhibits Higher Activity in the Presence of Excess Water Vapour than a Catalyst with an Alumina Support not Doped with Lanthanum The activity in the presence of excess water for catalysts prepared when using a lanthanum doped alumina support and an alumina support not doped with lanthanum was also examined. Pd-based catalysts were prepared by using either γ-alumina (0.5% $Pd/Al_2O_3$), a support that was not doped with lanthanum, or Puralox® Scfa 140L3 (0.5% Pd/Puralox®) that was doped with lanthanum. Each catalyst was tested using a gas composition of 1% $CH_4$, 10% $O_2$, 6% $CO_2$ and 10% $H_2O$ vapor (wt %) and the reactant gas hourly space velocity (GHSV) in the range of 44000-55,000 $h^{-1}$. The results are shown in Table 3 below.

TABLE 3

| $T_{50}$ of 0.5% $Pd/Al_2O_3$ and 0.5% Pd/Puralox ® Scfa 140L3 in the presence of excess water vapour (10 vol %) | |
|---|---|
| Catalyst | $T_{50}$ (° C.) |
| 0.5 wt % $Pd/Al_2O_3$ - no lanthanum | 440 |
| Pd(0.5) - with lanthanum | 392 |

The results in Table 3 show that the $T_{50}$ of Pd(0.5) is significantly lower (indicating higher activity) than that of a reference catalyst (0.5 wt % $Pd/Al_2O_3$), which contains no lanthanum. Thus, an activity improvement using an alumina support doped with lanthanum was realized.

Example 3: Sulfur Resistance and Hydrothermal Stability of Catalysts Having an Alumina Support Doped with Lanthanum at Different Weight Ratios of Platinum and Palladium The sulfur resistance of methane oxidation catalysts having an alumina support doped with lanthanum at different weight percents of platinum and palladium was examined. Catalysts PdPt(1:2), PdPt(2:2) and PdPt(2:4) were prepared by using Puralox® Scfa 140L3, which is doped with lanthanum. Each catalyst was then aged for 40 hrs at 500° C. in the presence of sulfur and water. Specifically, the gas composition was 1000 ppm $CH_4$, 10% $O_2$, 6% $CO_2$, 10% $H_2O$ vapour and 10 ppm $SO_2$ and the reactant gas hourly space velocity (GHSV) was ~55,000 $h^{-1}$. The results are shown in Table 4 below.

TABLE 4

| $T_{50}$ of catalysts prepared with various amounts of Pt and Pd on Puralox ® Scfa140L3 in the presence of water and sulfur. | |
| --- | --- |
| Catalyst | $T_{50}$ (° C.) Aged (40 h) |
| PdPt(1:2) | 481 |
| PdPt(2:2) | 508 |
| PdPt(2:4) | 449 |

The sulfur resistance and hydrothermal stability of the catalyst was significantly increased by using the combination of Pt and Pd on the Puralox® support and more specifically by using 2 wt % of Pd and 4 wt % of Pt, which corresponds to a weight ratio of Pt:Pd of 2:1. The $T_{50}$ of PdPt(2:4) (after 40 h of aging) is 32° C. lower and 59° C. lower than the $T_{50}$ obtained by PdPt(1:2) and PdPt(2:2), respectively, demonstrating the increased sulfur and water tolerance of PdPt(2:4).

Example 4: Effect of Calcination Temperature on Catalyst Activity

Table 5 shows the $T_{50}$ obtained after catalyst aging for 40 hours as a function of catalyst calcination temperature. The aging was performed at 500° C. using a gas stream having the following components: 10% $O_2$, 10% $H_2O$, 6% $CO_2$, 1000 ppm $CH_4$, 10 ppm $SO_2$, with the balance being $N_2$. The $T_{50}$ was determined using the same simulated exhaust gas composition as the experiments conducted in Example 1. After 40 hours of aging the $T_{50}$ of the catalyst calcined at 500° C. is similar to that of the catalyst calcined at 550° C. The results indicate that the catalyst activity is comparable when using both calcination temperatures. Based on these findings, a calcination temperature of 500° C. can be used for catalyst preparation to lower energy consumption and catalyst costs. In light of these results, all further catalysts were prepared using a calcination temperature of 500° C.

TABLE 5

| $T_{50}$ of catalysts prepared using different calcination temperatures | | |
| --- | --- | --- |
| Catalyst name | Calcination temperature (° C.) | $T_{50}$ (° C.) Aged (40 h) |
| PdPt(2:4) | 550 | 450 |
| | 500 | 446 |

Example 5: Effect of Method Preparation on Catalyst Activity

The methane oxidation catalysts shown in Table 6 below were prepared using one of two methods: incipient wetness impregnation (IWI) or wet impregnation (WI). For both methods, the precursors were added either sequentially or simultaneously to the support. When added simultaneously, the precursors were dissolved together and then added to the support followed by drying and calcination. If the sequential addition method was used, then the catalyst was dried and calcined between the additions of the metals. All sequential impregnations had the platinum precursor added first, followed by the addition of palladium precursor. All catalysts used a commercial lanthanum-doped γ-alumina, Puralox® SCFa-140 L3 (Puralox), as the support. $Pd(NO_3)_2 \cdot H_2O$ and $Pt(NH_3)_4(NO_3)_2$ were used for the palladium and platinum precursors, respectively.

TABLE 6

| $T_{50}$ of catalysts prepared by different preparation methods. | | |
| --- | --- | --- |
| Catalyst name | Preparation method | $T_{50}$ (° C.) Aged (40 h) |
| PdPt(2:4) | IWI Sequential | 446 |
| | IWI Simultaneous | 466 |
| | WI Sequential | 517 |
| | WI Simultaneous | 449 |

The results show that the method of preparation and the order of adding the precursor can have an impact on catalyst activity. The catalyst prepared using the IWI preparation method and adding the precursors sequentially (Pt followed by Pd) shows a lower $T_{50}$ than the catalyst prepared with the same method with the precursors added simultaneously (446° C. and 466° C., respectively). The result demonstrates that the IWI sequential addition can provide a better performing catalyst than that prepared by simultaneous IWI impregnation.

On the other hand the catalyst prepared by WI shows the opposite effect. The catalyst prepared using the sequential addition ($T_{50}$ of 517° C.) is less active than the catalyst prepared by adding the precursors simultaneously ($T_{50}$ of 449° C.).

The present invention has been described with regard to one or more embodiments and examples. However, it will be apparent to persons skilled in the art that a number of variations and modifications can be made without departing from the scope of the invention as defined in the claims.

The invention claimed is:

1. A method for reducing unburned methane in a gas stream resulting from methane combustion in a lean burn natural gas engine, said gas stream comprising sulfur, said method comprising introducing excess air into the combustion chamber of the lean burn natural gas engine, and passing the gas stream resulting from methane combustion in excess air through a methane oxidation catalyst having a support comprising alumina doped with 3 wt % lanthanum in the alumina matrix and an active phase consisting of platinum and palladium, thereby producing an exhaust stream from said natural gas engine having reduced levels of methane relative to the gas stream resulting from the methane combustion in the presence of sulfur, wherein the platinum and palladium are present in the methane oxidation catalyst at a weight ratio of Pt:Pd that is between 0.75:1.0 and 5.0:1.0.

2. The method of claim 1, wherein the gas stream resulting from the methane combustion has a temperature of between 350° C. and 600° C.

3. The method of claim 1, wherein the gas stream resulting from methane combustion comprises between 10 and 20,000 ppm of methane.

4. The method of claim 1, wherein the gas stream resulting from methane combustion comprises water.

5. The method of claim 1, wherein the platinum is present in the methane oxidation catalyst at between 0.5 and 10 wt %.

6. The method of claim 1, wherein the palladium is present in the methane oxidation catalyst at between 0.5 and 10 wt %.

7. The method of claim 1, wherein the platinum and palladium are present in the methane oxidation catalyst at a concentration effective to reduce the methane content in the gas stream resulting from methane combustion by at least 75% at 500° C. after 500 hours on stream.

8. The method of claim 1, wherein the methane oxidation catalyst has a $T_{50}$ of below 460° C. after aging in a simulated natural gas engine exhaust for 500 h at 500° C. in the presence of 10 vol % water and 10 ppm sulfur dioxide.

9. The method of claim 1, wherein the platinum is present in the methane oxidation catalyst at between 3 wt % and 10 wt % and the palladium is present in the methane oxidation catalyst at between 1 wt % and 10 wt %.

10. The method of claim 1, wherein the weight ratio of platinum-to-palladium is greater than 1:1.

11. The method of claim 1, wherein the palladium is present in the methane oxidation catalyst at greater than 2 wt %.

12. The method of claim 1, wherein the methane oxidation catalyst is prepared by incipient wetness impregnation in which the platinum and palladium are added sequentially and in which platinum is added before palladium, or wherein the methane oxidation catalyst is prepared by wet impregnation in which the platinum and palladium are added simultaneously.

13. The method of claim 1, wherein the alumina is gamma alumina.

14. The method of claim 1, wherein the specific surface area (BET) of the support is at least 120 m²/g.

15. The method of claim 1, wherein the gas stream resulting from methane combustion comprises oxygen.

* * * * *